United States Patent [19]

Adams

[11] Patent Number: 4,858,936
[45] Date of Patent: Aug. 22, 1989

[54] SPLIT GLAND SEAL ASSEMBLY

[76] Inventor: David G. Adams, Box 131 Vly Summit Rd., Greenwich, N.Y. 12834

[21] Appl. No.: 154,426

[22] Filed: Feb. 8, 1988

Related U.S. Application Data

[63] Continuation of Ser. No. 924,208, Oct. 29, 1986, abandoned.

[51] Int. Cl.⁴ .................. F16J 15/24; F16J 15/16; F16J 15/54; B21D 39/00
[52] U.S. Cl. .......................................... 277/1; 29/428; 29/469; 277/58; 277/102; 277/104; 277/105; 277/187; 277/192
[58] Field of Search ............... 277/1, 58, 192, 102, 277/104, 105, 123, 125, 187; 29/428, 469

[56] References Cited

U.S. PATENT DOCUMENTS

| | | | |
|---|---|---|---|
| 211,873 | 3/1879 | Van Riper | 277/192 |
| 582,109 | 5/1897 | Wood | 277/104 |
| 661,329 | 11/1900 | Thompson | 277/104 |
| 765,111 | 7/1904 | Turnback | 277/104 |
| 1,020,780 | 3/1912 | Taylor | 277/104 |
| 1,143,854 | 6/1915 | O'Neil | 277/104 |
| 1,486,708 | 3/1924 | Wells | 277/104 |
| 2,625,413 | 1/1953 | Christensen | 277/105 X |
| 2,726,885 | 12/1955 | Lucey | 277/104 |
| 3,006,667 | 10/1961 | Stephens | 277/187 X |
| 3,186,724 | 6/1965 | Wheatley | 277/105 X |
| 3,434,727 | 3/1969 | Kollenberger | 277/58 |
| 3,545,771 | 12/1970 | Downing et al. | 277/187 |
| 3,577,833 | 5/1971 | Skelton | 277/102 X |
| 3,595,585 | 7/1971 | Bristow | 277/58 |
| 4,394,023 | 7/1983 | Hinojosa | 277/105 X |
| 4,476,772 | 10/1984 | Gorman et al. | 277/58 X |

FOREIGN PATENT DOCUMENTS

| | | | |
|---|---|---|---|
| 1319972 | 1/1963 | France | 277/187 |
| 160464 | 12/1981 | Japan | 277/105 |

Primary Examiner—Allan N. Shoap

[57] ABSTRACT

A split seal assembly comprising a seal gland and spool are disclosed to retrofit a packed seal around a shaft.

6 Claims, 2 Drawing Sheets

SPLIT GLAND SEAL ASSEMBLY

This application is a continuation of application Ser. No. 924,202 filed 10/29/86 now abandoned.

The present invention relates to a split gland seal assembly. More particularly, the present invention relates to a split gland seal assembly for retrofitting certain packed seals to packingless use.

BACKGROND OF THE INVENTION

Packed seals are well-known and used to prevent leakage around various rotating machine parts, such as pump shafts, mixer shafts and the like. However, it is also known that such seals require constant maintenance to minimize leakage. The packing gland which applies pressure to the packing in the stuffing box must be periodically tightened and, on a less frequent basis, the packing in the box must be supplemented with additional packing or entirely replaced. Further, even with ideal maintenance, packed seals will leak over time due to uneven shaft wear at the point of packing contact and wear on the shaft at other contact points leading to shaft run out and wobble.

Replacement of worn shafts in smaller machinery is a very simple matter requiring a few hours time and a comparatively few inexpensive parts. However, for machinery using a large diameter shaft, for example, a shaft having a diameter of 2 inches or more, the situation is quite different. Replacing a shaft in this case will require a hoist to remove the housing, a hoist to remove the shaft, and subsequently a great amount of manpower and down time. Most important, however, the cost of the shaft including the impeller or mixer blade assembly will often exceed the replacement cost of the machinery. Manufacturing a single or a few large shafts with high tolerance for placement in machinery that may be 20 years old is not a situation where the cost effectiveness of mass production may be realized.

It is therefor an object of the present invention to provide a split seal assembly to retrofit packed seals to packingless seals.

It is a further object of the present invention to provide a split seal assembly to operate under conditions where the shaft is worn and exhibits resultant run out and wobble.

It is yet another object of the present invention to provide a split seal assembly which can be placed on the shaft without accessing of the shaft ends.

SUMMARY OF THE INVENTION

Briefly, according to the present invention there is provided a split seal assembly containing:

(a) a seal gland defining an axially centered opening containing:
  (i) a first seal engaging surface radially located around the opening to engage a seal with a protruding shaft;
  (ii) a mounting portion radially spaced from seal engaging surfaces;
  (iii) a second seal engaging surface or connecting surface on the inner face of the gland radially spaced from the opening to engage a seal or connection with a spool extending along the axis of the opening, and
  (iv) a third seal engaging surface on the inner face of the gland radially spaced from said second seal engaging surface to engage a seal with a rim area of a stuffing box; and (b) the spool, extending along the axis of the opening from the second seal engaging surface of the gland, having length, diameter and thickness to substantially occupy a stuffing box and having on the interior surface thereof a fourth seal engaging surface to engage a seal with a shaft;

wherein the seal gland and the spool are split along a plane which is defined by the axis of the opening and a point not on the axis with means to mate the split. Further, there is provided a method for retrofitting a packed seal therewith.

DETAILED DESCRIPTION OF THE INVENTION

Figure 1:
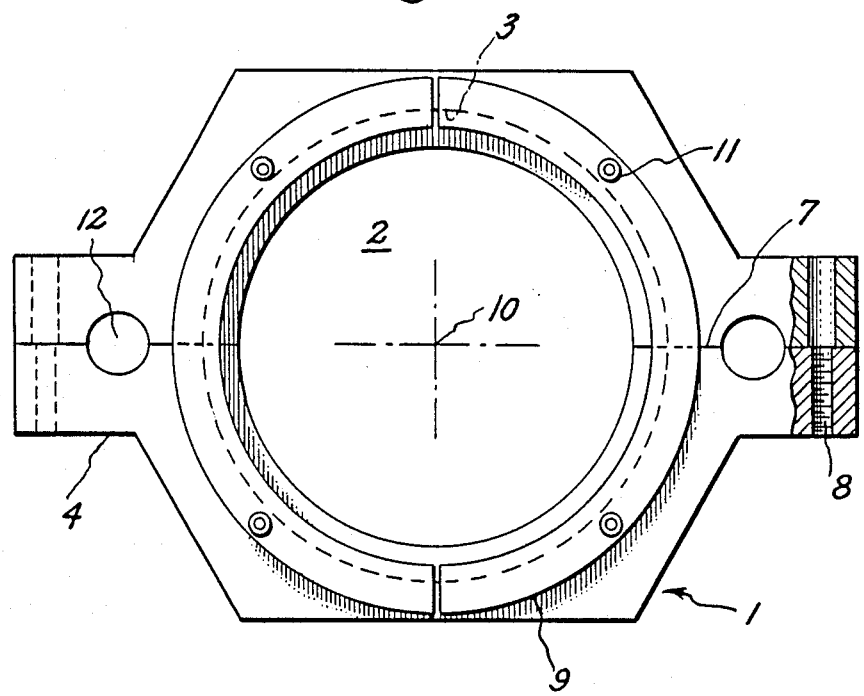
FIG. 1 is a plan view of the seal gland of the present invention.
Figure 2:
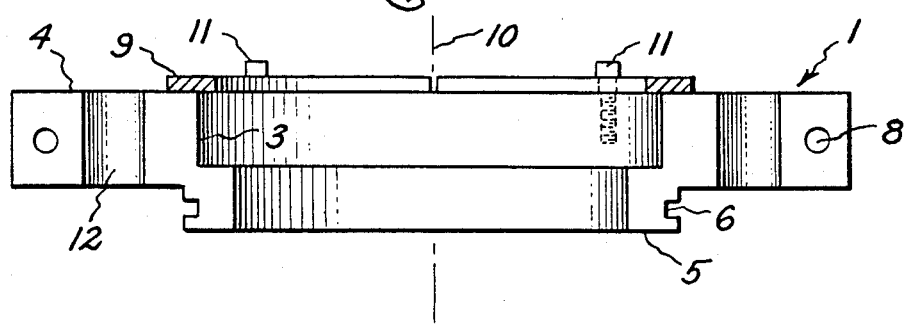
FIG. 2 is a cross sectional view of the seal gland taken along the split 7 of FIG. 1.

Referring now to the drawings, FIGS. 1-4 illustrate a seal gland 1 and its use according to a preferred embodiment of the invention. Seal gland 1 comprises a casting in the form of an annulus which defines a circular opening 2 and is adapted for mounting around a shaft 16 of predetermined diameter. The annulus is split along split 7 which if extended would pass through the axis 10 of the circular opening 2. One set of bolt positions 8 is provided as a means to mate the split 7.

Radially located around opening 2 is a first seal engaging surface 3. Seal engaging surface 3 should be positioned relative to the shaft 16 to allow a first seal 19 to be inserted and engaged with the shaft. Persons skilled in the art can imagine suitable seals for use on seal engaging surface 3. A preferred seal is a lip seal. In this embodiment seal retaining means 9 forms an edge around seal engaging surface 3 to prevent seal 19 seated on seal engaging surface 3 from working free. Bolt positions 11 are provided to secure seal retaining means 9. Of course, seal retaining means 9 can be cast as part of seal gland 1, but is provided as a separate split part to facilitate replacement of seal 19 seated on seal engaging surface 3. In the embodiment shown, seal 19 consists of dual lip seals seated on seal engaging surface 3.

Spaced radially from seal engaging surfaces 3 and 6 are mounting portions 4 containng bolt positions 12. Mounting portions 4 are intended for use to secure the seal gland 1 to the machinery housing 18. Mounting the seal gland 1 may be accomplished with clamps, bolts, etc., the means of mounting not being critical to the invention. In this particular embodiment bolts are employed and thus mounting portions 4 generally extend outward from the rough annular shape of seal gland 1. However, it is obvious that the diameter of seal gland 1 could easily be maintained as a constant with radially spaced bolt positions 12 at set invervals.

On the inner face of seal gland 1 and radially extending from the opening 2 is a second seal engaging surface 5. Seal engaging surface 5 is shaped to engage seal 20 with a spool 13 entending along the axis 10 of opening 2. The preferred seal 20 in this instance is a flat circular gasket which will seal by compression between the second seal engaging surface 5 and one end of the spool. Of course the second seal engaging surface 5 may be indented to receive and secure an o-ring type seal and the like, the type of seal on this surface not being critical. Though not preferred, proper shaping of seal engaging surface 5 to effect close mating with the end of the spool 13 may permit the seal to be eliminated.

Axially spaced from the second seal engaging surface 5 is a third seal engaging surface 6 an an axial inner face of the seal gland 1 which faces a rim area of stuffing box 17. The third seal engaging surface 6 must be positioned so as to engage seal 21 with a rim area of stuffing box 17. As shown, where the seal is to be engaged with the inner lip of the stuffing box 17 the preferred seal is an o-ring received and secured in the indentation. However, it is clear that the third seal engaging surface 6 may be positioned in any manner that will prevent leakage between seal gland 1 and machinery housing 18. One alternative position for the third seal engaging surface is facing the outerlip of the stuffing box 17 radially inward from bolt positions 12.

Sealed or connected with seal gland 1 at second seal engaging surface 5 is spool 13. It is the purpose of spool 13 to substantially fill the stuffing box 17 and to provide additional seal engaging surfaces along shaft 16 and the innerwall of stuffing box 17. Shown in this embodiment is a fourth seal engaging surface 15 running the circumference of the spool 13 inner wall 14. The fourth seal engaging surface 15 is designed in this instance as a baffle seal where an o-ring, stationary on shaft 10, rotates inside fourth seal engaging surface 15. Fourth seal engaging surface 15 is cut with sufficient width and depth so that the o-ring rotates just free of contact with the spool 13. This type of seal is particularly effective where viscous materials are handled. However, the fourth seal engaging surface may also be designed to receive more commonly used seals which may be stationary with respect to either the shaft 10 or spool 13 such as a lip seal, an o-ring stationary in the spool 13, and the like. The fourth seal engaging surface 15 may be repeated down the length of the spool 13. Although not shown further seal engaging surfaces may be placed so as to run the circumference of the spool 13 and or outer wall and secure seals which make contact with the stuffing box 17 wall.

As stated above, a purpose of spool 13 is to substantially fill the volume of the retrofitted stuffing box 17. Thus, it is preferred that the length, diameter and thickness should approximate the dimensions of the stuffing box 17 and entirely fill the available space. It is preferred that spool 13 make no contact with shaft 16. The contact of spool 13 with the stuffing box 17 inner and back wall is necessary however in this instance to maintain pressure at the noted surfaces of the spool 13 and the second seal engaging surface 5. Persons skilled in the art will recognize that contact between spool 13 and stuffing box 17 is not necessary with the proper placement of additional seals or gaskets.

Figure 3:
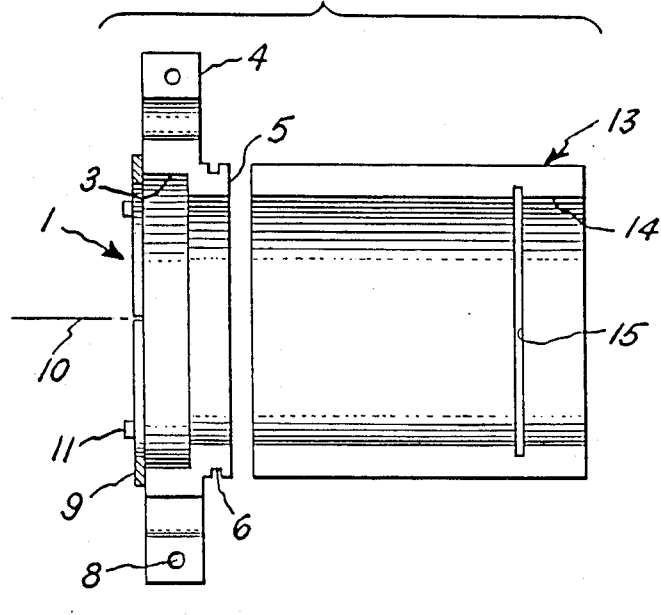
FIG. 3 is a cross sectional view of the seal gland in alignment with the spool of the instant invention.
Figure 4:
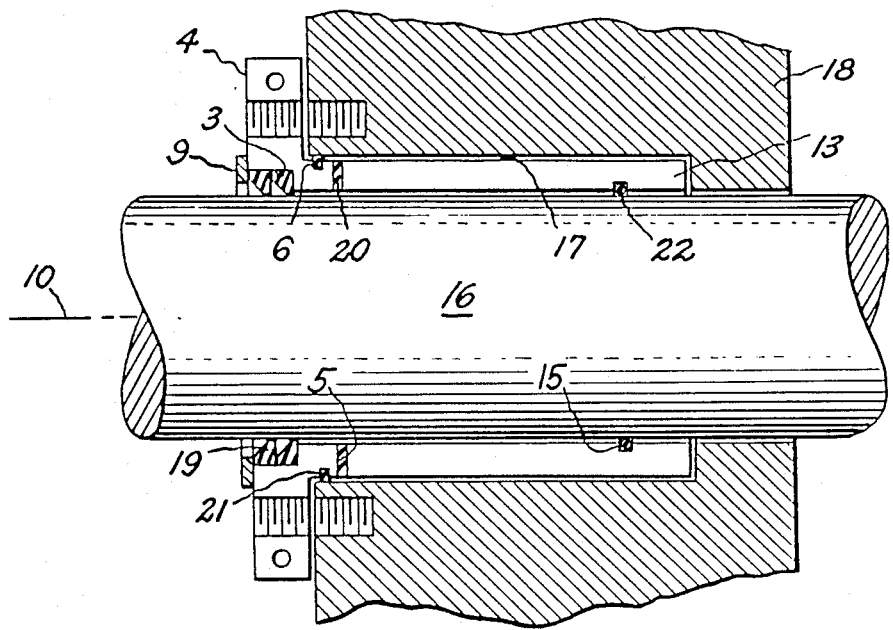
FIG. 4 is a cross sectional view of the seal gland and spool inserted into a stuffing box to seal a shaft.

Similar to seal gland 1, spool 13 is split along a plane which is defined by the axis 10 of opening 2 and a point not on the axis. FIGS. 3 and 4 depict this split aligned with the split 1 of seal gland 1. In the embodiment shown, the spool 13 is mated by contact with the stuffing box 17 wall.

Spool 13 may be made from a variety of materials including aluminum, steel and other metals, but is preferably made from thermoplastic or thermoset plastics including polyesters, polycarbonates and polyolefins such as polytetrafluoroethylene. Of course, where a thermoplastic or thermoset plastic is used, high heat resistance may be essential. In this instance, spool 13 is polytetrafluoroethylene, which facilitates the mating of the split and the omission of a seal at seal engaging surface 5.

According to the invention herein, packing seals may be retrofitted by removing the packing and packing seal gland. Spool 13 is split and placed around shaft 16 mating the split surfaces. Concurrently fourth seal 22 is cut, placed around shaft 16, rejoined with adhesive, and seated in fourth seal engaging surface 15. Adhesive or a strip gasket may be used to join the mated split of spool 13 but where the fit of the mated surfaces is tight and the fit of spool 13 against the walls of stuffing box 17 is snug, adhesives may be unnecessary. Subsequently spool 13 and fourth gasket 22 are fitted into the stuffing box 17. Seal gland 1 is disassembled and split along split 7 and placed arund shaft 16. Seal gland 1 is mated using bolts in bolt positions 8. Second seal 20, if used, and third seal 21 are cut, placed around shaft 16, rejoined with adhesive, and seated on their respective seal engaging surfaces 5 and 6. Seal gland 1 is torqued dow to seal with spool 13 using bolts in bolt positions 12. Subsequently, first seal 19, a pair are shown here, is cut, placed around shaft 16, rejoined with adhesive, and seated on seal engaging surface 3. Seal 19 is secured with split retaining means 9 and bolts in bolt positions 11.

The split seal assembly of the instant invention is particularly suitable for use on shafts which do not have accessible ends. Mixer shafts, pump shafts and the like have drive units which attach to the shaft as some point and would prevent retrofitting of whole gland seals on shafts which are not easily disassembled.

The split seal assembly herein, of course, requires maintenance, but unlike packed seals will provide an effective seal in situations where the shaft is worn and exhibits run out and wobble. The present invention is particularly advantageous where large shafts are employed, i.e. shafts having a diameter of two inches or more. Further, the present invention finds its greatest utility for seals on relatively slow turning shafts, for example shafts which see rotational velocities less than about 100 rpm, and for seals which have low to moderate pressure heads, for example 0-200 psig. Machinery fitting the above description includes mixers for the food industry such as bread dough mixers and mixers for the chemical industry such as rubber compounding mixers.

Other embodiments of this invention will occur to those skilled in the art which are within the scope of the following claims.

What is claimed is:

1. A split seal assembly for preventing the transfer of liquid or other material along a rotatable shaft extending from within a machine to the outside thereof through said assembly, said machine including a hollow stuffing box surrounding a portion of said shaft;
said assembly comprising:
a split spool located in said stuffing box and coaxially surrounding said shaft, said spool including a pair of separable spool sections disposed to mate in a plane through the axis of said shaft and further including a spool groove in the interior spool surface coaxially surrounding said shaft;
a split seal gland positioned axially outward of said machine and comprising a pair of separable gland sections disposed to coaxially surround said shaft, said gland defining an annular space coaxial with and adjacent to said shaft open in an axially outward direction, said gland including an annular extension protruding axially into said stuffing box, said extension including an extension groove open in a radially outward direction and coaxially surrounding said shaft;

a first seal positioned in said annular space in contact with said shaft;

a second seal positioned between said extension and said spool;

a third seal positioned in said extension groove in contact with said groove and a surface of said machine;

a retaining ring detachably mounted on an axially outward facing surface of said gland, said retaining ring at least partly overlapping the opening of said annular space to retain said first seal within said space; and a baffle seal disposed coaxially on said shaft so as to rotate therewith, said baffle seal extending into said spool groove out of contact with said spool;

whereby said gland, said spool and said seals may be removed jointly without displacement of said shaft.

2. The split seal assembly of claim 1 wherein said shaft has a diameter greater than about 2 inches.

3. The split seal assembly of claim 1 wherein said seal gland is capable of withstanding a pressure head of about 0 psig.

4. A split seal assembly for preventing the transfer of liquid or other material along a rotatable shaft extending from within a machine to the outside thereof through said assembly, said machine including a hollow stuffing box surrounding a portion of said shaft; said assembly comprising: (a) a seal gland (i) mounted on the outside of said machine radially spaced from and coaxially surrounding said shaft, said seal gland being split into a pair of sections along a plane which includes said axis, said sections being removably attachable to each other;

(ii) including a first surface facing in a radially inward direction;

(iii) including a first seal mounted in contact with said first surface and said shaft;

(iv) including an extension protruding into said stuffing box in an axially inward direction, said extension comprising a second surface facing in said axially inward direction and a first groove open in a radially outward direction and coaxially surrounding said shaft;

(v) including a sealing gasket in contact with said second surface;

(vi) including a first o-ring disposed in said first groove in sealing contact with the latter and said machine;

(vii) including a mounting surface facing in an axially outward direction;

(viii) including a retaining ring detachably affixed to said mounting surface radially spaced from and coaxially surrounding said shaft, said retaining ring contacting said first seal and compressing it in an axial direction;

(ix) including mounting portions extending radially outward from said seal gland, said mounting portions being removably fastened to said machine; and (b) a spool split into two sections along a plane which includes said axis, said spool (i) having length, diameter and thickness dimensions to substantially fill said stuffing box, said spool being radially spaced from and coaxially surrounding said shaft;

(ii) including a surface facing in an axially outward direction in contact with said sealing gasket;

(iii) including a second groove facing in a radially inward direction; and (c) a second o-ring mounted on said shaft and rotatable therewith within said second groove but out of contact with said spool;

whereby said seal gland and said spool may be removed from around said shaft in sections without removal of said shaft or other connected equipment.

5. The split seal assembly of claim 4 wherein said shaft has a diameter greater than about 2 inches.

6. A method of retrofitting a seal assembly surrounding a rotatable shaft, said shaft extending from within a machine to the outside thereof through said seal assembly, said machine including a hollow stuffing box surrounding a portion of said shaft;

said method comprising the steps of:

placing a baffle seal coaxially on said shaft so as to rotate therewith;

fitting a split spool into said stuffing box coaxially surrounding said shaft, said spool including a pair of separable sections disposed to mate in a plane through the axis of said shaft, said spool including a spool groove in the interior spool surface coaxially surrounding said shaft, said spool being positioned such that said baffle seal extends into said spool groove without contacting said spool, said spool further including an axially outward facing surface;

positioning a gasket seal in contact with said axially outward facing spool surface;

said seal assembly including a split seal gland comprising a pair of separable gland sections configured to coaxially surround said shaft and defining an annular space coaxial with and adjacent to said shaft open in an axially outward direction, said gland further including an annular axial extension having an extension groove open in a radially outward direction;

positioning an O-ring seal within said extension groove;

positioning said split seal gland around said shaft with said extension protruding into said stuffing box in contact with said gasket seal;

positioning a lip seal within said annular space in contact with said shaft and said gland; and detachably mounting a retaining ring on an axially outward facing surface of said gland, said retaining ring at least partly overlapping the opening of said annular space to retain said lip seal within said space.

* * * * *

UNITED STATES PATENT AND TRADEMARK OFFICE
CERTIFICATE OF CORRECTION

PATENT NO.   : 4,858,936

DATED        : August 22, 1989

INVENTOR(S)  : David G. Adams

It is certified that error appears in the above-identified patent and that said Letters Patent is hereby corrected as shown below:

On the title page;

[73] Assignee: should be General Electric Company
                               Waterford, NY Signed and Sealed this Third Day of July, 1990

*Attest:*

HARRY F. MANBECK, JR.

*Attesting Officer*   Commissioner of Patents and Trademarks